United States Patent [19]

Wilkes et al.

[11] Patent Number: 5,316,695
[45] Date of Patent: May 31, 1994

[54] USE OF POLYMERIC CATALYST IN SYNTHESIS OF SOL-GEL DERIVED CERAMIC MATERIALS

[75] Inventors: Garth L. Wilkes; Anthony B. Brennan, both of Blacksburg, Va.

[73] Assignee: Virginia Tech Intellectual Properties, Inc., Blacksburg, Va.

[21] Appl. No.: 392,189

[22] Filed: Aug. 10, 1989

[51] Int. Cl.$^5$ .......................... B01J 13/00; C03C 3/06
[52] U.S. Cl. ............... 252/315.6; 252/315.2; 501/12; 502/159
[58] Field of Search ............... 252/315.2, 315.6, 315.7; 501/12; 423/338; 502/159; 556/483

[56] References Cited

U.S. PATENT DOCUMENTS

| | | | |
|---|---|---|---|
| 2,861,045 | 11/1958 | Langer, Jr. | 502/159 |
| 3,791,808 | 2/1974 | Thomas | 501/12 X |
| 4,397,666 | 8/1983 | Mishima et al. | 65/18.1 X |
| 4,495,297 | 1/1985 | Puyané et al. | 501/12 |
| 4,514,329 | 4/1985 | Wakabayashi et al. | 501/12 X |
| 4,584,280 | 4/1986 | Nanao et al. | 501/12 X |
| 4,710,227 | 12/1987 | Harley et al. | 501/12 X |
| 4,715,986 | 12/1987 | Grüning et al. | 252/315.2 |
| 4,732,879 | 3/1988 | Kalinowski et al. | 502/171 X |
| 4,789,389 | 12/1988 | Schermerhorn et al. | 501/12 X |

FOREIGN PATENT DOCUMENTS 312855 8/1971 U.S.S.R. .............................. 502/159

OTHER PUBLICATIONS

Nakanishi et al.: "Crystallization of Silica Gels Containing Sodium Poly-4-Styrene Sulfonate", *Journal of Non-Crystalline Solids*, 108 (1989) 157–162.

"The Sol-Gel Process", *Chemical Reviews*, 1990, vol. 90, No. 1, p. 35.

*Primary Examiner*—Richard D. Lovering
*Attorney, Agent, or Firm*—Richard P. Fennelly; Louis A. Morris

[57] ABSTRACT

Polymeric catalysts (e.g., polymeric acid catalysts such as poly(styrene)sulfonic acid) can be used in the synthesis of sol-gel derived ceramic materials from metal alkoxides, for example, organic/inorganic hybrid materials formed by reaction of a metal alkoxide and a reactive endcapped polymeric modifier. The use of a polymeric catalyst, rather than a conventional monomeric (inorganic or organic) acid catalyst, has a non-deleterious effect on the aging behavior and offers potential for control of rheological properties (spinnability, coatability, etc.) of the hybrid materials.

14 Claims, 5 Drawing Sheets

FIG. 1

NOMENCLATURE FOR SOL GEL HYBRIDS
TEOS(60)-PTMO(2K)-100-0.048

| ITEM | DESCRIPTION |
|---|---|
| TEOS | Tetraethylorthosilicate |
| (60) | Ratio of TEOS To Oligomer (Wt%) |
| PTMO(2K) | Functionalized Oligomer (MW) |
| 100 | Ratio Water To Alkoxide (Mol%) |
| 0.048 | Ratio Acid To Alkoxide (Mol%) |
| (IPA/THF) (DMF/THF) | Solvents For Compatibility |

Mechanical Analysis of PSS Ceramer
TEOS(X)PTMO(2K)100-0.014 PSS

USE OF POLYMERIC CATALYST IN SYNTHESIS OF SOL-GEL DERIVED CERAMIC MATERIALS

BACKGROUND OF THE INVENTION

Several previous studies have demonstrated the successful incorporation of various functionalized oligomers into a sol-gel network to produce novel organic/hybrid materials referred to as "ceramers". References which describe such previous work include: Huang, H. et al., Macromolecules 1987, 20(6), 1322; Huang, H. et al., Polym. Bull., 14(6), 557 (1985). These initial studies involved a sol-gel reaction using tetramethylorthosilicate (TMOS) or tetraethylorthosilicate (TEOS) and silanol-terminated poly(dimethylsiloxane), for instance, under acidic conditions. The next systems investigated were hybrids based upon TEOS and TMOS, or related metal alkoxides, reacted with an oligomer of poly(tetramethylene oxide) endcapped with isocyanatopropyltriethoxysilane. The molecular weight of the oligomers was varied from 650 grams/mole to 2900 grams/mole. The silane-endcapped PTMO oligomers were also reacted with the silane under acidic conditions. The novel hybrid materials produced were monoliths with good mechanical properties and were optically clear.

The acids or bases typically employed in these sol-gel reactions for preparation of the ceramers, as well as conventional sol-gel ceramic materials, include hydrochloric acid (HCl) and glacial acetic acid. The presence of such species in the final material may lead to an accelerated aging effect. The ability of the chloride species to migrate in the material would also be expected to influence the ionic conductivity. in addition, there is a potential interest in fiber drawing or spinning applications for sol-gel derived materials.

A literature reference by K. Nakanishi et al. appears in J. Non-Crystalline Solids 108 (1989) 157-162, which speaks of the crystallization of silica gels containing sodium poly-4-styrene sulfonate which is not deemed to have functioned as a polymeric catalyst in such a system since the purpose of the sodium poly-4-styrene sulfonate was to initiate crystallization. In addition, a mineral acid was added to catalyze the sol-gel reactions instead of utilizing a polymeric acid catalyst.

DESCRIPTION OF THE DRAWINGS

The Drawings, which form a part of the present Specification, include:

FIG. 1, which illustrates the nomenclature used herein (e.g., in the legends in FIGS. 2-5);

DESCRIPTION OF THE INVENTION

Figure 2:
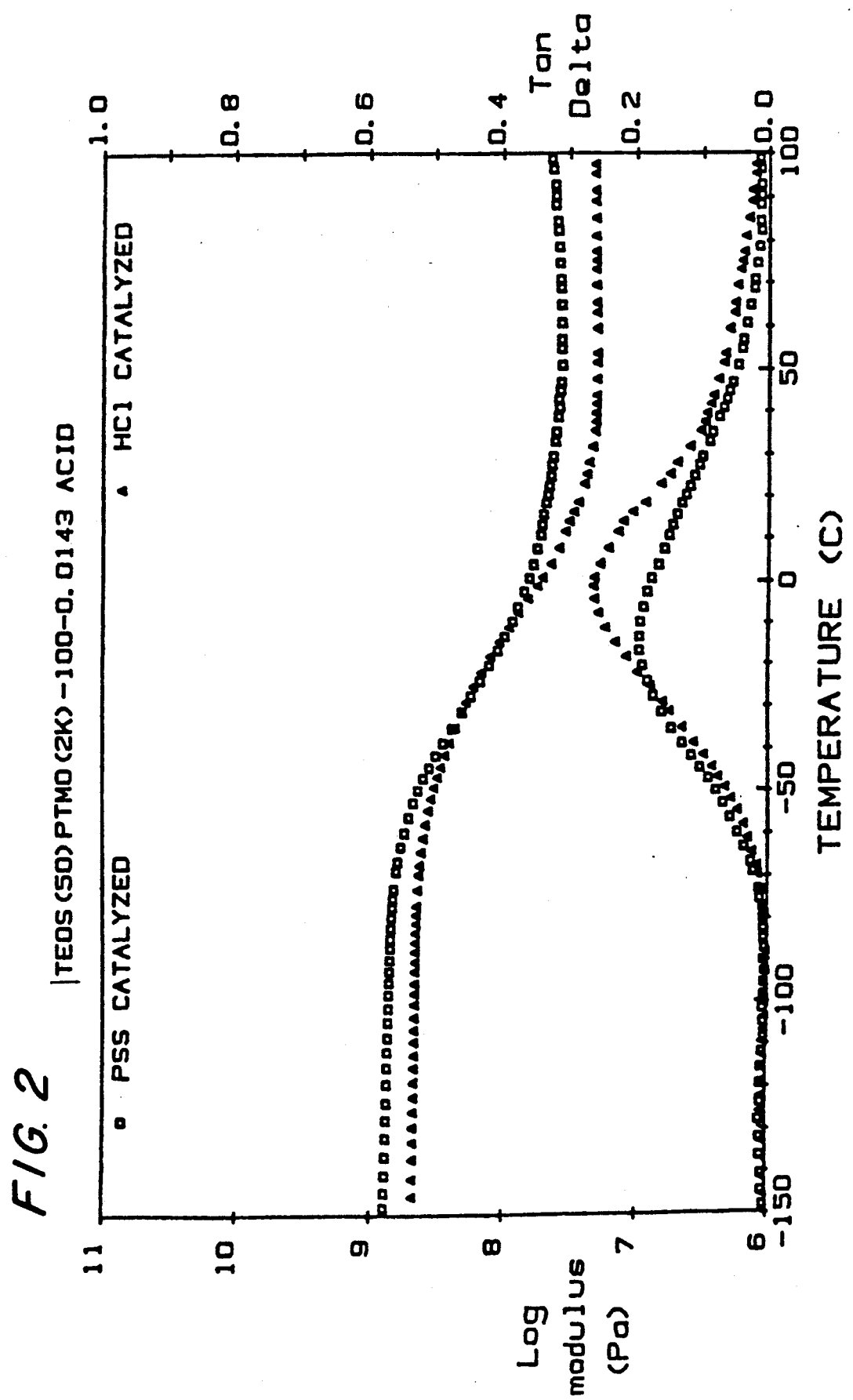
FIG. 2, which represents the storage moduli and tan delta behavior for poly(styrene sulfonic acid), PSS, and hydrochloric acid (HCl) catalyzed ceramers of similar composition.

The instant invention describes the use of a polymeric catalyst in forming such sol-gel derived materials to reduce the potential deleterious effect such as ion migration following gelation which is characteristic of materials catalyzed by conventional low molecular weight catalysts (acids or bases). In addition, the polymeric catalyst should help control the flow or rheological behavior of the system in the sol state to enhance spinnability and coatability. The instant invention is deemed applicable to the synthesis of both conventional ceramic materials from metal alkoxides by sol-gel synthesis as well as the sol-gel derived organic/inorganic hybrids formed from metal alkoxides and a functionalized organic modifier (e.g., an alkoxy silane-endcapped polymeric modifier). In such hybrid systems, up to about 90%, by weight, is a ceramic component, derived from a suitable metal alkoxide by hydrolytic condensation, with the remainder being a functionalized organic modifier. Such "ceramer" materials are described in the earlier referenced publications of H. Huang et al.

In accordance with the instant invention, a catalytically effective amount (e.g., about 0.5% to about 3.0%, by weight, of the alkoxide) of a polymeric acid or base catalyst is used in the sol-gel synthesis. Representative polymeric acid catalysts include such synthetic polyelectrolytes as poly(acrylic acid), poly(methacrylic acid), poly(ethylenesulfonic acid), poly(vinylsulfuric acid), poly(styrenesulfonic acid) and poly(vinylphenylsulfuric acid). Representative polymeric bases include poly(vinyl pyrrolidone), poly(benzimidazole), and poly(4-vinylpyridine).

EXAMPLES

Triethoxysilane endcapped poly(tetramethylene oxide) PTMO was synthesized by the following procedure. A 1:1.1 equivalent mole ratio of PTMO to 3-isocyanatopropyltriethoxysilane was mixed in a three neck round bottle flask under nitrogen. This system was under constant stirring and was maintained at a temperature of 60° C. The reaction was monitored by infrared spectroscopy using the absorptions for the functional groups of —OH and —N=C'O which were reduced in intensity and which eventually dispersed. The formation of the urethane linkage was monitored as well. The reaction was allowed to run 100 hours until substantially complete. The poly(styrene sulfonic acid) PSS (70,000 gram/mole) was supplied as a 30 wt % solution (Polysciences, Inc., Cat. No. 8770). This was used as is without further purification. There were 0.0026 equivalents/gram of the PSS solution by titration with standardized NAOH. The density of the PSS solution was determined to be 1.2 gram/ml. The TEOS was obtained from the Fluka Company and was used as received.

PROCEDURES

Six milliliters of isopropanol (IPA) and four milliliters of tetrahydrofuran (THF) were mixed in a 50 ml flask at room temperature. A 5 gram portion of TEOS and 5 grams of the silane endcapped oligomer were weighed into the IPA/THF solvent and were stirred for approximately ten to fifteen minutes. The distilled-deionized water was then added volumetrically with stirring. One milliliter of the PSS solution (about 0.9 gtam of PSS) was then added dropwise to the solution with vigorous stirring. The mixture (a sol) was stirred for one to two minutes after addition of the acid, was then cast into a petri dish coated with fluoropolymer (TEFLON brand), and was then covered to reduce evaporation. The sol was then allowed to gel undisturbed at ambient conditions for five days and was then opened to the air to remove excess solvent. The age of a gel was designated from the date of preparation of the sol.

CHARACTERIZATION METHODS

The dynamic mechanical data were obtained using an automated Toyo Rheovibron Dynamic Viscoelastometer Model DDV-IIC. Most samples were analyzed between $-150°$ C. and 100° C. at a rate of 1° to 3° C. per minute. All spectra represent data that was obtained at 11 Hz.

The mechanical properties were measured with an Instron Model 1122 using an initial strain rate of 2 mm/min at 25° C. The dogbone specimens ranged in thickness from 15 to 35 mils with a 10 mm initial gage length. The reported values represent an average of at least four and typically five specimens.

A Siemens Kratky camera system was utilized for small angle x-ray scattering (SAXS) measurements in conjunction with a M. Braun position-sensitive detector from Innovative Technology Inc.

RESULTS AND DISCUSSION

The storage moduli and tan delta behavior are represented in FIG. 2 for two TEOS(50)-PTMO(2K)-100-0.014 ceramers aged for ten days. One sample was catalyzed with HCl and the other with PSS. The storage modulus is similar for the two systems throughout the temperature range scanned. The broad tan delta peak indicates by its maximum that the $T_g(-15°$ C.) of the PSS ceramer was slightly lower than the $T_g(-10°$ C.) of the HCl-catalyzed ceramer. This behavior is believed to be caused by a higher degree of reaction. This is contrary to the expected tan delta behavior for a network forming system. A model, proposed for a related system describes two types of motional restrictions on the PTMO oligomers that give rise to the tan delta peak (see H. Huang et al., (Polym. Preprints, 28(2), 1987). A TYPE 1 restriction would occur as the PTMO segments are reacted at both ends into the silicate network. This restriction would increase the amount of thermal energy necessary for inducement of motion in the oligomer and thus raise its $T_g$ slightly. The second restriction, TYPE 2, would be the result of encapsulation or mixing of the PTMO oligomer within the condensed TEOS network. The TYPE 1 restriction would be expected to predominate in a system with poor phase mixing. The TYPE 2 restriction would be prevalent as both the level of phase mixing and the extent of reaction increase, respectively. The PSS tan delta peak's magnitude is decreased and the modulus increases compared to the HCl. These observations suggest a slightly higher level of incorporation of the PTMO segments using PSS as a catalyst. The peak tan delta temperature indicates an increased condensation of the silicate structure (see S. Sakka et al., J. of Non-Crystall. Solids 24 (1986).

Figure 3:
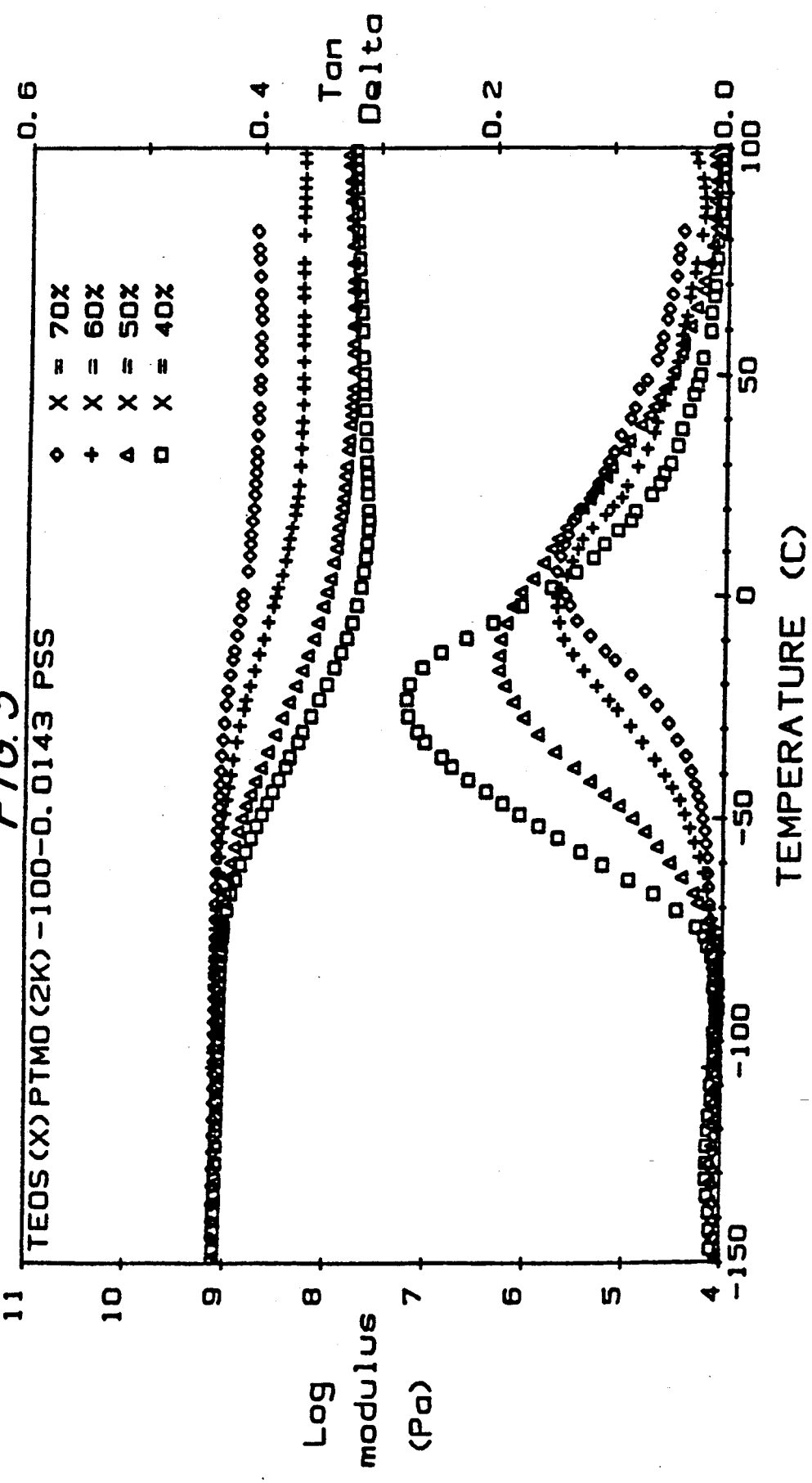
FIG. 3, which illustrates the dynamic mechanical behavior of PSS catalyzed ceramers as a function of varying concentrations of tetraethyl orthosilicate (TEOS)

To further investigate the type of structure developing in these systems, the effect of higher levels of TEOS on the modulus and tan delta behavior were studied. The dynamic mechanical behavior, as a function of TEOS concentration, for a PSS-type ceramer based on the 2000 gram/mole endcapped PTMO oligomer is presented in FIG. 3. The storage moduli in the rubbery region increases from about $10^7$ to $10^8$ Pa with an increasing level of TEOS from 40 to 70 wt %. Note also the shift in the maximum amount of TEOS along with a decrease in its magnitude. All the tan delta peaks appear to start around $-80°$ C. then become quite broad as the TEOS is increased. This agrees with previous literature studies on similar formulations with HCl as the catalyst. Similar trends are observed for the lower molecular weight oligomers of silane endcapped PTMO.

Figure 4:
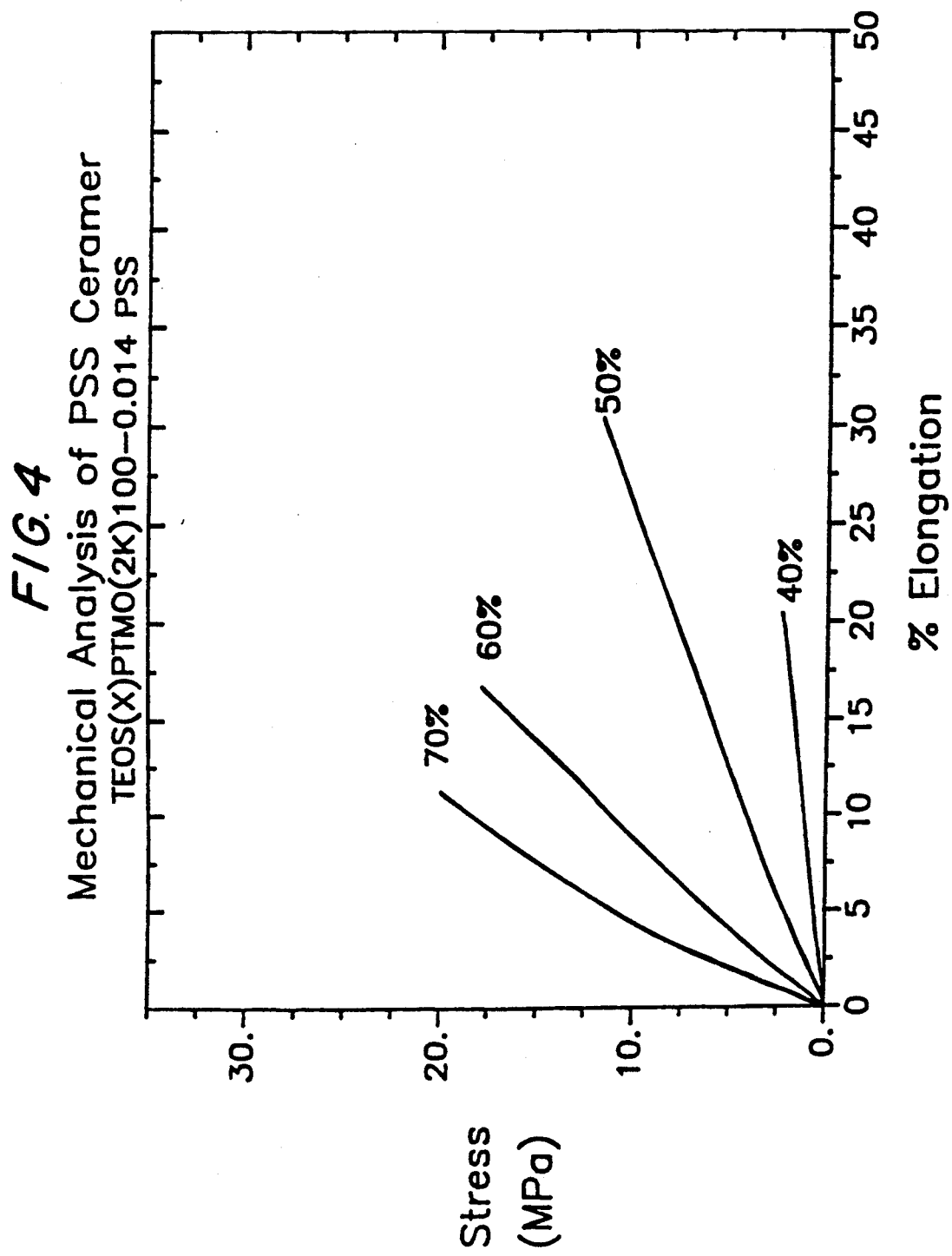
FIG. 4, which illustrates the stress-strain behavior of PSS catalyzed ceramers as a function of varying concentrations of TEOS at an initial strain rate of 2 mm/min and an initial gage length of 10 mm for the dogbone sample.

The corresponding stress-strain behavior of this series of PSS catalyzed ceramers (FIG. 4) clearly demonstrates an increase in the modulus at 25° C. corresponding to an increase in the level of TEOS. The modulus for the 40 wt % TEOS ceramer is 25 MPa compared to 250 MPa for the modulus of the 70 wt* TEOS sample. These values, measured ten days after casting, compare to equivalent compositions of the HCl ceramers which were tested thirty days after casting. This further supports the observation the PSS catalyzed systems proceed to a somewhat higher extent of reaction than the HCl catalyzed ceramer of comparable compositions for the same time period.

Figure 5:
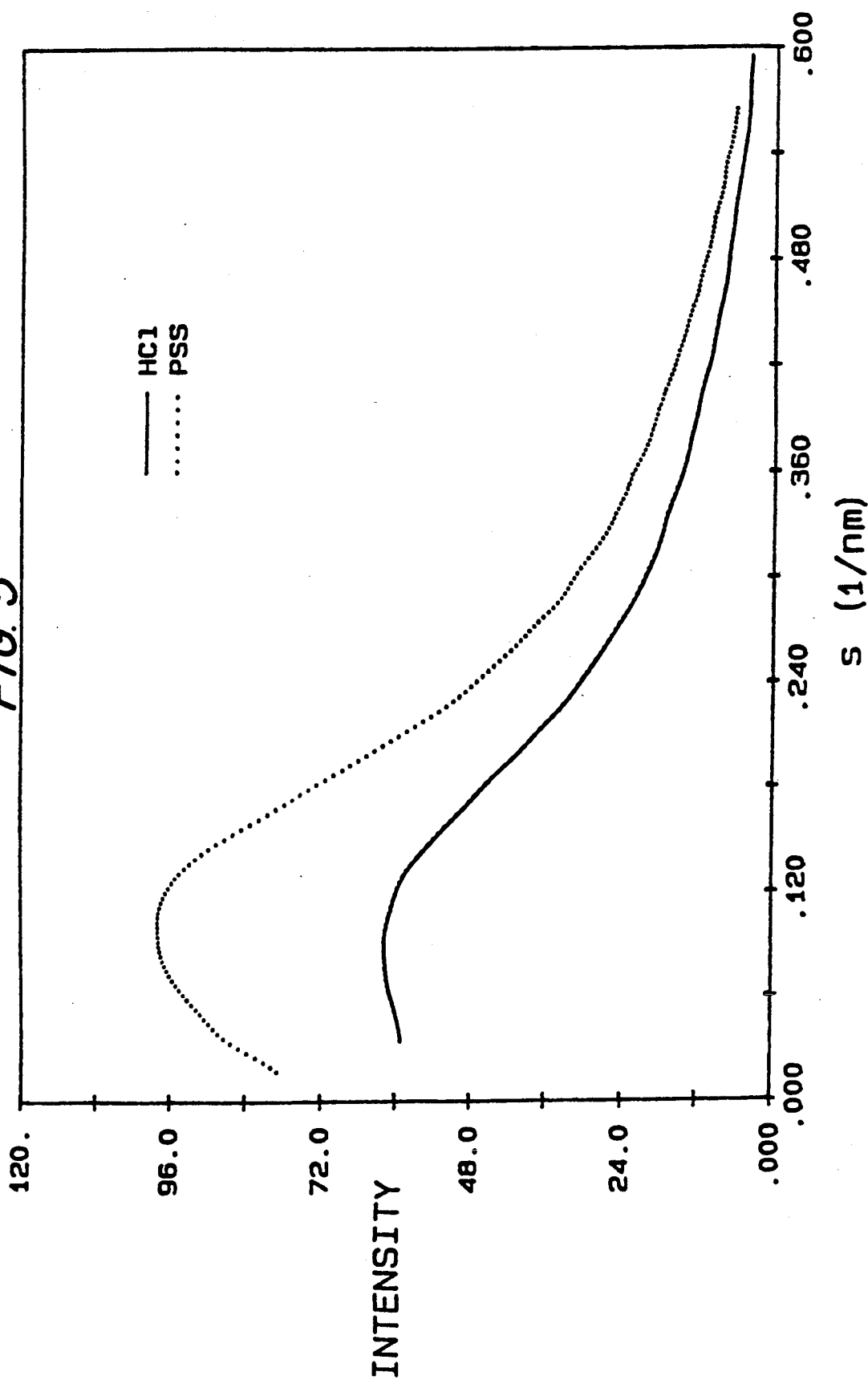
FIG. 5, which shows the small angle x-ray scattering behavior for two ceramers of a TEOS(50)-PTMO(2K)-100-0.014 composition, as defined by the nomenclature in FIG. 1, one being PSS catalyzed and the other HCl catalyzed.

The SAXS behavior of a PSS ceramer and a HCl ceramer is presented in FIG. 5 as a plot of the smeared intensity versus s, the scattering vector. The scattering vector is defined as 2 sin theta lambda, where theta is one-half the radial scattering angle and lambda is the wavelength. The existence of a maximum in the scattering profiles indicates there is a characteristic distance in the scattering source. This suggests a correlation distance may exist as a result some degree of microphase separation.

The reciprocal of s which can be used as an estimate of the correlation length, and is similar for the two samples, implies their morphologies are not significantly different. The somewhat higher intensity for the PSS ceramer compared to the HCl catalyzed material is however further support of a higher level of reaction in the PSS catalyzed sample. Poly(styrene sulfonic acid), PSS, is an effective catalyst for the preparation of novel hybrid materials prepared by the incorporation of oligomers into a sol gel derived network. The elastic modulus at 25° C. increased from 25 to 250 MPa as a function of an increasing level of TEOS from 40 to 70 wt %. The stress at break is higher for the PSS catalyzed ceramer as compared to the HCl catalyzed material of comparable degree of reaction. The PSS ceramer had a maximum tan delta peak 15° C. lower than the HCl catalyzed ceramer. The SAXS behavior was similar for both systems. Overall, we have noted no significant changes in the ultimate mechanical properties or structure (morphology) for a comparable degree of reaction. In summary, the catalytic nature of the polymeric acid catalyst in those novel hybrid materials indicates they may apply equally well as a catalyst for classical sol-gel reactions and possibly offer control of rheological behavior.

We claim:

1. In a method for the synthesis of sol-gel derived ceramic materials comprising the hydrolytic condensation of a metal alkoxide using a catalyst, the improvement which comprises using a polymeric catalyst.

2. A method as claimed in claim 1 wherein the material is a sol-gel derived organic/inorganic hybrid material derived from a metal alkoxide and an alkoxy silane-endcapped polymeric modifier.

3. A method as claimed in claim 2 wherein the polymeric catalyst is a polymeric acid catalyst.

4. A method as claimed in claim 3 wherein the catalyst is poly(styrenesulfonic acid).

5. The method as claimed in claim 3 wherein the catalyst is used to form a hybrid material containing up to about 90%, by weight, ceramic component with the remainder an organic component.

6. A method as claimed in claim 1 wherein the polymeric catalyst is a polymeric acid catalyst.

7. A method as claimed in claim 6 wherein the catalyst is poly(styrenesulfonic acid).

8. A composition adapted to form a ceramic material via sol-gel synthesis which comprises a metal alkoxide and a catalytically effective amount of a polymeric catalyst for the sol-gel synthesis.

9. A composition as claimed in claim 8 which also comprises a an alkoxy silane-endcapped polymeric modifier.

10. A composition as claimed in claim 9 wherein the metal alkoxide comprises up to about 90%, by weight, of the composition and an alkoxy silane-endcapped polymeric modifier comprises the remained of the composition.

11. A composition as claimed in claim 10 wherein the catalyst is poly (styrenesulfonic acid).

12. A composition as claimed in claim 9 wherein the catalyst is polymeric acid catalyst.

13. A composition as claimed in claim 8 wherein the catalyst is polymeric acid catalyst.

14. A composition as claimed in claim 13 wherein the catalyst is poly (styrenesulfonic acid).

* * * * *